(12) United States Patent
Haley

(10) Patent No.: US 10,782,524 B2
(45) Date of Patent: Sep. 22, 2020

(54) SKYDIVING TRACKER: AN INTEGRATED SYSTEM FOR FLIGHT DATA COLLECTION AND VIRTUAL REALITY SIMULATORS FOR IMPROVING SKYDIVING SAFETY

(71) Applicant: Mark Haley, McKinney, TX (US)

(72) Inventor: Mark Haley, McKinney, TX (US)

(*) Notice: Subject to any disclaimer, the term of this patent is extended or adjusted under 35 U.S.C. 154(b) by 203 days.

(21) Appl. No.: 15/996,433

(22) Filed: Jun. 2, 2018

(65) Prior Publication Data
US 2018/0356635 A1    Dec. 13, 2018

Related U.S. Application Data

(60) Provisional application No. 62/517,216, filed on Jun. 9, 2017.

(51) Int. Cl.
| | |
|---|---|
| *G02B 27/01* | (2006.01) |
| *A63G 31/00* | (2006.01) |
| *G06F 3/01* | (2006.01) |
| *G06T 19/00* | (2011.01) |
| *A63F 13/57* | (2014.01) |

(Continued)

(52) U.S. Cl.
CPC ............ *G02B 27/017* (2013.01); *A63F 13/57* (2014.09); *A63F 13/65* (2014.09); *A63G 31/00* (2013.01); *G06F 3/011* (2013.01); *G06T 19/006* (2013.01); *A63F 13/807* (2014.09); *A63G 2031/005* (2013.01); *G02B 2027/0141* (2013.01); *G02B 2027/0187* (2013.01)

(58) Field of Classification Search
CPC .............................. G02B 27/012; A63F 13/65

USPC ......................................................... 345/633
See application file for complete search history.

(56) References Cited

U.S. PATENT DOCUMENTS

| | | | | |
|---|---|---|---|---|
| 5,616,031 A | * | 4/1997 | Logg ..................... | A63F 13/005 434/38 |
| 6,000,942 A | * | 12/1999 | Hogue ................... | B64D 23/00 434/30 |

(Continued)

OTHER PUBLICATIONS

Steven Dondero, Team Leader, John Kovalicky, Gary Baumgartner, etc., "Final Accident Investigation Factual Report, Smith Prairie Smokejumper Fatality", U.S. Department of Interior, BLM, Sep. 27, 2013, Updated May 2, 2014 pp. 18, 50-56 Human Factors Analysis by Randy McCalip LtCol, USAF, BSC.

(Continued)

*Primary Examiner* — Jason C Olson

(57) ABSTRACT

This integrated skydiving safety/training system combines sensors, hardware and software technologies to improve skydiving for individuals and teams of 12 or more military or civilian skydivers. It dramatically improves skydivers' training and helps prevent the leading causes of skydiving deaths, including mid-air collisions and dangerous landings. The system offers innovative error-correction on low-cost trackers to collect flight data to improve debriefings after jumps for planeloads of jumpers and create an expert proprietary flight database with hundreds of jumps. This can be used for debriefings/accident investigations which can be done in minutes, where before it took months to analyze accidents. It plots this data into 3D Interactive Maps and the real-time radio version can track teams in the air or on the ground, and museums can use the interactive mapping option to display stunning tours of the earth and moon.

9 Claims, 11 Drawing Sheets

(51) Int. Cl.
   *A63F 13/65*       (2014.01)
   *A63F 13/807*      (2014.01)

(56) References Cited

U.S. PATENT DOCUMENTS

| | | | | |
|---|---|---|---|---|
| 6,929,480 | B2* | 8/2005 | Lee | A63G 31/00 |
| | | | | 434/247 |
| 7,819,664 | B2* | 10/2010 | Petruk | A63G 31/00 |
| | | | | 434/59 |
| 9,682,326 | B2* | 6/2017 | Burroughs | A63G 21/20 |
| 9,843,771 | B2* | 12/2017 | Shuster | G02B 27/017 |
| 9,863,772 | B1* | 1/2018 | Moyerman | G01C 21/165 |
| 2003/0055541 | A1* | 3/2003 | Haley | B64D 45/0015 |
| | | | | 701/11 |
| 2011/0246002 | A1* | 10/2011 | Shavit | G08G 5/0026 |
| | | | | 701/14 |
| 2013/0335405 | A1* | 12/2013 | Scavezze | G06T 19/20 |
| | | | | 345/419 |
| 2017/0354887 | A1* | 12/2017 | Bollermann | A63F 13/803 |

OTHER PUBLICATIONS

Tom Harbour, Director, "U.S. Forest Service Ram-Air Parachute System Implementation Project", Change Management Implementation Plan (CMIP), U.S. Forest Service, Jun. 2015, p. 71-72.
Sales Brochure Redacted for the Patent Office, Analytical Software inc. Apr. 2018.
Draft of paper for speech in Korea in the summer of 2018 Kevin Huang, Daming Xing, Mark Haley, An Intelligent Sensor-Driven Skydive Tracking System.

\* cited by examiner

TABLE 1
WIND SPEED vs. DISTANCE TO SPOT (TARGET)

| Distance To Spot \ Wind Speed | 0-5 mph | 6-10 mph | 11-15 mph |
|---|---|---|---|
| 0-55 ft. | 6 jumps | | |
| 56-110 ft. | *24 jumps* | *4 jumps* | 6 jumps |
| 111-220 ft. | *7 jumps* | *15 jumps* | |
| 221-330 ft. | | *13 jumps* | |

*1st week*     *2nd week*     Veteran jumpers

Flowchart Logic of "The Skydiving Tracker" (Part 1 of 5)

US 10,782,524 B2

SKYDIVING TRACKER: AN INTEGRATED SYSTEM FOR FLIGHT DATA COLLECTION AND VIRTUAL REALITY SIMULATORS FOR IMPROVING SKYDIVING SAFETY

TECHNICAL FIELD

The present invention is related to skydiving training and safety, with related 3D virtual reality (VR) simulators and the integrated collection of GPS tracking data for 3D mapping for debriefings and accident investigations and also to continuously improve the simulator with an expanding proprietary database of jump flight data. It focuses on training teams of skydivers with planeloads of 12 or more skydivers on crucial missions such as smokejumpers (firefighters who skydive into remote fires) or military teams with crucial missions often at night. The existing systems are expensive, cumbersome and take too much time to use.

BACKGROUND

Skydivers exit a plane with either a short or extended freefall. Then the jumper manually opens the parachute or a device can automatically open the chute. At that point, the skydiver must steer the parachute towards the target by moving their arms up and down to either turn or control the speed of the chute. Finally, at the target they must try to head into the wind, if possible, to reduce the landing speed and thereby reduce the chance of injuries on landing.

Jumpers who use round parachutes (an older less-controllable technology) often have a very short freefall and almost immediately open the parachute. Most civilian jumpers want the excitement of the freefall and exit at 12,000 feet or higher above ground level (AGL) and open the parachutes at 4,000 feet AGL to enjoy a roughly 1-minute freefall. There are a number of existing skydiving simulators and related patents such as U.S. Pat. No. 6,929,480 Aug. 16, 2005—Skydiving Simulator and Skydiving Training Process, using the Same, which was an improvement to earlier patents such as U.S. Pat. No. 5,655,909, Aug. 12, 1997, A Skydiving Trainer Wind Tunnel. These focus on wind tunnels as a key part of training. Another technology involves having the student get rigged into a harness, an elaborate and expensive simulation. The wind tunnel approach is best to practice the freefall, but it's difficult to simulate malfunctions so it is usually seen as entertainment for novices to experience skydive without the risk of falling 12,000 ft.

Expert skydivers usually say the best training is real skydives where the novice begins in tandem jumps with the expert trainer and then progresses to becoming a fully-certified skydiver. Unfortunately, the existing systems focus more on elaborate simulators rather than expediting the quick transitions to actual jumps. Also, the existing training systems fail to easily permit 12 or more jumpers to train as a team within 30 minutes. The existing simulators are too cumbersome, costly and time-consuming to use and are often better-suited for entertainment. One company has perfected the wind tunnels which it primarily sells to novices who will never skydive but just want the thrill of a freefall and in 2017 it had at least 37 of these wind tunnels for public use. While experts can perfect some freefall techniques, it is not designed to cost-effectively train for malfunctions such as the spin shown in our YouTube video. Experts questioned the use of these costly, cumbersome simulators and requested our technology to quickly train novices and teams of experts on our simulators so they could quickly improve their techniques in real skydives.

Existing wind tunnel simulators are good at training basic freefalls but they don't train well for malfunctions such as rotating at 60 revolutions per minute, as reported in this 111-page accident report on the tragic 2013 death of Mark Urban, "BLM Final Accident Investigation Factual Report, Smith Prairie Smokejumper Fatality". He may have never practiced a simulation of the type of malfunction we provide in this August 2017 video of an amazing flight based on real flight data of 45 rpm. If he had seen this he might have changed how he jumped. PLEASE SIT DOWN WHEN YOU WATCH IT.

Dangerous YouTube Spin (Sit while Watching)—https://youtu.be/U_Q82cvzQHA

Summary from BLM Report: Urban took a jump he never had tried before and was "nervous". All of Urban's "previous 287 jumps were conducted at approximately 3,000 feet above ground level (AGL) . . . [Urban exited] from 6,000 feet AGL . . . an additional 20-25 seconds of descent time; something [Urban] had never experienced . . . [Urban] exited the aircraft and immediately entering a right spin . . . [Urban] initiates parachute deployment at 138 ft. AGL. [Urban] became confused after entering a prolonged spin . . . . The rapid spin [up to 60 rpm] subjected [Urban] to 4-5 Gz forces and exacerbated by hyperventilating, [Urban] experienced a gravity-induced loss of consciousness (G-LOC i.e. a blackout)."

Moreover, these expensive, cumbersome systems are not suited to training a team of 12 jumpers who often must work together on missions. Our system lets a group of 12 or more to carry a VR-capable laptop in their backpack with a VR headset, setup in 10 minutes and plan jumps (FIGS. 1-3). They can even practice on a plane flying to their targets, an amazing feature which the current systems don't address.

The other key issues related to enhancing skydive simulations and for debriefings are the accuracy of the trackers and the ability to quickly translate this data into stunning 3D interactive displays. Our system allows these options immediately as shown in the YouTube video and in FIG. 2 which shows a smokejumper in gear 201 watching a large display 202 as he practiced and simply moved his arms as in a real skydive where trackers translate his arm movements into control of the chute to the group. A more powerful option is the Virtual Reality (VR) headset FIG. 2 204 and FIG. 3 where a team of elite jumpers practice missions inexpensively by donning just the headset immersed in a stunning 3D world, networked together either locally or remotely. Only their skydiving instructor sees a top-down view in daylight of the target and all jumpers so he can manage the team jump as they land on a remote island FIG. 3.

While ground trackers such as car GPS systems are relatively reliable on flat, clear terrain, they often fail in valleys in the mountains where there is no clear sight to multiple satellites needed for GPS. This is even more important for Above Ground Level (AGL), altitude and True altitude (which is the actual elevation above sea level). Our technology not only tracks with error corrections, it ranks widely-used trackers and digital watches (which sometimes include GPS trackers); and our system can be customized for any GPS or other types of trackers including expensive military systems. However, our system goes a step further and ranks trackers and has shown that some of the most popular trackers (and even more so for digital watches) are often 300 feet off on elevation readings. As a result, when you are on the ground these flawed trackers indicate you're 300 feet underground. Obviously for aviation, including skydiving, this would be disastrous. Also, for debriefing and accident investigations, these errors are unacceptable especially for the real-time version of this technology which alerts the skydiver to take evasive action if a mid-air collision is imminent. The two major causes of the dozens of deaths and hundreds of injuries in the U.S. each year are related to: (1) hard landings, including crashing into obstacles on the ground; and (2) mid-air collisions. The addition of low-cost radios and antennas to our system for real-time communications with the ground or with aircraft flying above is a quantum advantage since this low-cost, self-contained device could be crucial for tracking ground crews such as the 20 firefighters who died in wildfires in the Yarnell Hill Fire on Jun. 30, 2013, where their cell phone communications failed ("Serious Accident Investigation Report, Yarnell Hill Fire, Jun. 30, 2013"). Also, these self-contained units could be deployed on commercial or other aircraft and when a rogue pilot takes control of the plane, these units could be programmed to eject in remote areas or as the plane descends such as during an approach over water like Malaysia Airlines Flight 370 which vanished on Mar. 8th 2014 while flying from Malaysia, to Beijing. The Joint Agency Coordination Center (JACC) estimated that $200 million was spent searching for this aircraft. The small system developed with our technology with the ability to send signals over 100 miles could be deployed for under $1,000 per plane with a radio and GPS tracking with 3 units per plane. The tests discussed for our proven technology were conducted on a fixed-wing aircraft flying at 200 mph. Obviously, a version for a commercial aircraft flying at 600 mph and flying over the ocean would have to be ruggedized, float, and include a rugged solar panel for extended communication. These additional features could triple the price to $3,000 per plane.

Technology which can Improve Training and Save Lives: Skydiving Deaths/Injuries—

There were 3.2 million U.S. jumps in 2013 and each year hundreds are injured and dozens die. The goal of this technology is to make skydiving safer for both experts and novices with better training before and during jumps and debriefings after jumps which include stunning 3D interactive maps. An analysis of the 24 deaths (2013) and 930 injuries (2012) in the U.S. and the 637 deaths worldwide in the last decade revealed that almost 50 percent of the deaths were related to collisions and landing problems including drowning by unplanned water landings or hitting power lines. Here are typical preventable examples: (1) canopy collision at 150 feet, one died (France, Jun. 3, 2014); (2) canopy collision, two died (Belgium, May 17, 2014); (3) canopy collision at 1,200 feet (the "deceased turned into the flight path of the survivor" Jan. 25, 2014, Arizona); and (4) canopy collision at 200 feet, both died (Arizona, Dec. 3, 2013). A key safety device is the Automatic Activation Device (AAD), which automatically opens a parachute if the Skydiver is unable to open it. Airtec GmbH & Co., KG Safety Systems claims its market-leading Cypress AAD saved 2,000 lives. If a significant number of skydivers had the advance situational awareness of the real-time version of the device in this technology, a number of lives might have been saved.

The Skydiver Tracker has been proven in hundreds of jumps. The inventor has a background in robotics, mapping and skydiving and was a Professor at Chiba University and is President of Analytical Software. Inc. This company managed many robotics projects including being the prime contractor on the Multi-Autonomous Ground-robotic International Challenge 2010 (MAGIC2010). The inventor was the project manager and the team ranked in the top 6 in the world.

DETAILED DESCRIPTION

Figure 1:
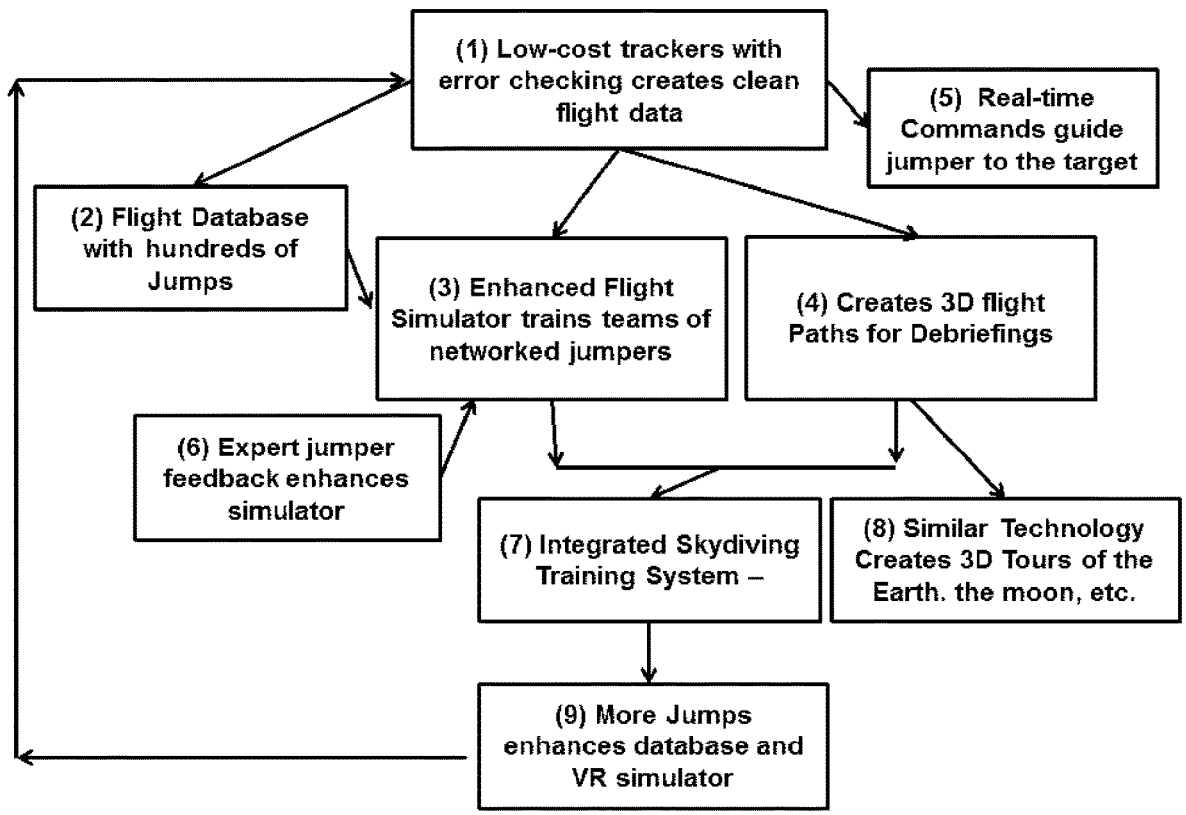
FIG. 1 is an overview Flow Chart logic of the Claims. This skydiving training and safety system is an integrated combination of hardware and software which creates an error-corrected flight database for simulation, tracking and debriefings and expedites skydiver training.

This invention offers an integrated state-of-the-art skydiving safety and training system with an amazing combination of sensors and hardware and software technologies which improves skydiving safety for individual skydivers or teams of military or civilian skydivers. FIG. 1 highlights how the system: (1) dramatically improves training teams of skydivers and (2) helps prevent the leading causes of skydiving deaths including mid-air collisions and landing in dangerous areas such as lakes or power lines. The "Skydiving Tracker" was originally developed as a technology to collect skydiving flight data to improve debriefings after jumps for a planeload of jumpers and was successfully used on hundreds of jumps and tracked and debriefed accidents in minutes where previously it took months to analyze accidents. It then plots this data into interactive maps of any locations worldwide so it can be used not only by skydivers but also by museums to display stunning tours (with music and/or voiceover) anywhere in the universe.

FIG. 1 highlights key claims of this patent—one of the most important features is that it allows teams of 12 or more jumpers to train together. The GPS data from the 12 or more jumpers continuously updates the flight data database which is used for accident investigations and debriefings enhances the Virtual Reality simulator and even improves the error-checking of the data by cross-checking flight data between jumpers (you know the landing elevation and exit point so this helps the GPS data from 12 jumpers to be cross-checked and corrected).

In block 1, low-cost trackers from any of a wide range of trackers (widely used trackers for cars, hiking and also digital watches and which could be customized for any proprietary systems) with our proprietary error-checking creates clean flight data (Latitude, Longitude, Altitude, etc.). There are a number of error-checking techniques from basic to more advanced which we use (the customer sees none of these and each time they start the program they agree not to reverse engineer our technology as part of the user's agreement—if they disagree they can't start the program). GPS data can be flawed for a number of reasons. Usually multiple satellites provide this info, but as the ground is more cluttered with forests or hills or mountains, less data is available and the latitude, longitude and altitude readings fail. Moreover, when the jumpers are in the plane sometimes where they sit also provides poor data. Our technology rates trackers. Some of the best-selling digital watches aren't that good, and even the widely used trackers for cars or hiking give readings which show that the jumper was 300 ft. underground when they landed. Trackers continue to evolve and we rate and rank the best, least expensive options. For additional details on these error-checking techniques see the last pages before the claims.

The tracking data impacts four other features: In block 2 the flight data is continuously used to add to a Proprietary Skydiving database with detailed flight data on hundreds of jumps. In block 3 the flight data continuously enhances the Virtual Reality (VR) 3D Flight Simulator which permits teams of 12 or more jumpers networked to train together. In block 4 the flight data creates Stunning 3D Interactive Flight Paths of Jumpers/Aircraft for Debriefings/Accident Investigations. In block 5 the flight data provides optional real-time commands to the jumper to guide towards the target.

In block 6 feedback from expert jumpers is also used to continuously enhance the VR simulator. The net result of the continuously growing clean proprietary skydiving and other databases is an endlessly improving VR simulator and 3D mapping of flight data for debriefings and accident investigations: In block 7 a state-of-the-art training system for skydivers offers simulations before jumps, guidance during jumps and debriefings after jumps. In block 8 similar technology for museums creates interactive 3D Tours of the greatest sites on earth (Grand Canyon, Paris, the moon, etc.). Finally, in block 9 more jumps with more tracking improves training of jumpers, pilots, and spotters, and enhances the database and VR simulator.

We previously filed non-provisional patents (and are noting this in case there was any leaking of that data) which create the tools for this technology. While a Professor in Japan, the inventor considered filing a patent but since he had developed the technology with his personal company and it was separate from his work as a Professor, he decided not to file at that time. Our company has now been developing this technology for a number of years. What makes this final Patent unique is: (1) low-cost trackers from $100 and also it can be customized for expensive trackers which provide clean flight data (using our technology to clear up GPS data which has many errors); (2) using this flight data for accident investigations, jump debriefings and for reliable data for the Virtual reality simulator; (3) the related maps to continuously monitor teams in the air and on the ground for the simulation or real missions; (4) the simulator uses both this data plus feedback from expert jumpers on many types of parachutes, such as round chutes, an older technology and precise faster RAM chutes, now widely used; (5) using a state-of-the-art system which trains teams of skydivers with networked realistic interactive jumps using commercially available 3D low-cost maps available on PCs or cell phones; and (6) this same interactive system provides 3D tours around the world or the moon and Mars, etc.

Figure 3:
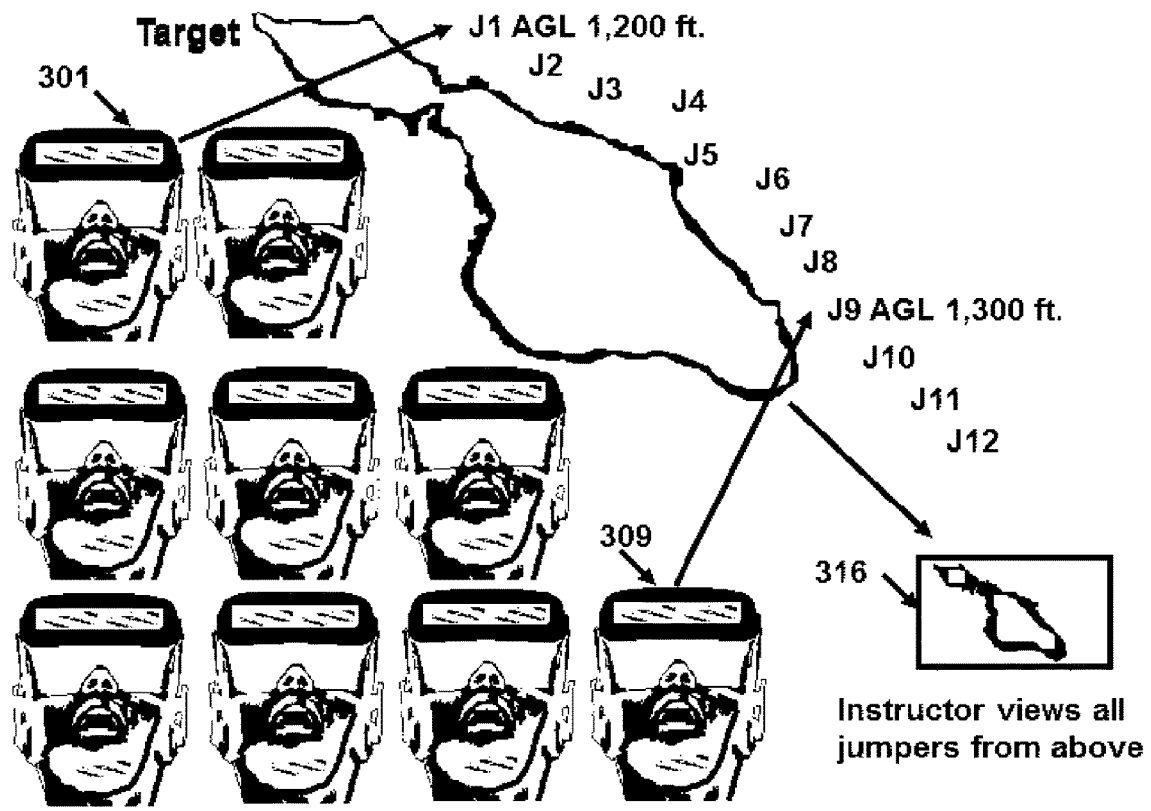
FIG. 3 shows the networked version where it permits over 12 skydivers to work as a team using low-cost headset VR Simulators using the Skydiving Tracker (only 9 jumpers shown with VR headsets and 12 tracked on the map). The skydiving instructor sees the top-down view.

Flaws of other technology: Some companies use a harness with a simulator to train skydivers but their system is and expensive at over $100,000 each (June 2016 GSA pricelist). It takes time for each jumper to get in the harness and it's expensive. On our system, you just put the headset on and then its sensors track you as you move your arms like a real skydive. Our hardware is only $2,000, roughly $1150^{th}$ the cost of this harness type training, but more importantly these harness systems aren't designed for, or cost-effective for, team training and we provide better graphics and customized flight data that matches the unique needs of the jumpers. One of the most important features of our system is that we network teams of jumpers where they just put their headsets on, each with a $2,000 device, so teams of 12 jumpers can train together (FIG. 3).

Key components and contributions of the system include methods for efficient data consolidation from multiple sensors and immediate intuitive feedback. These provide rapid training, real-time tracking and status notification, and post-jump accident investigation and flight debriefing for skydivers. The system also incorporates a simulator which can be used prior to jumps. Quantitative and qualitative evaluation was performed on real jumps (over four hundred total jumps), the results of which are encouraging towards the use of this system for all skydivers from training to post-jump feedback. For real-time data acquisition, a holistic approach to jump analysis is utilized, whereby data from GPS, a priori topological terrain data, flight path, and pilot and spotter information are all consolidated to rapidly inform qualitative feedback to the jumper. This low-cost approach is robust compared to poor global positioning system (GPS) readings by leveraging multiple types of inexpensive, lightweight sensors and a rule-based classifier to isolate and extrapolate only reliable sensor information from hundreds of thousands of relevant data points. The method is furthermore extendable to and improved with multiple simultaneous jumpers—more jumpers provide additional data for cross-checking and consistency. In addition to novel data acquisition and processing, the system extracts relevant data and transforms the data into intuitive, 3D visual feedback during or almost immediately following the jump. 3D aircraft flight path, jump path and landing accuracy are just a few of the analytical capabilities which are generated immediately.

Technical improvements to the jumpers are also calculated and displayed. Such information is useful, for example, to debrief both spotters and jumpers to prepare for safely and accurately landing on target. The tracking system is also amenable to various types of tracker sensors and hardware and can thus provide a basis for quantitative comparison between hardware as it relates to skydive tracking. In contrast to the proposed system, other currently implemented methods rely on single-modality sensing and expensive, nonrobust tracking equipment and procedures, and can require months of analysis and data refinement before accident investigations can be reliably conducted. The system proposed here was evaluated quantitatively and qualitatively. A 2016 injury was analyzed within fifteen minutes after receiving flight data, and detailed 3D flight path, data and graphics were generated. It isolated the cause of the accident, showed the best camera angles for the jump, and simultaneously displayed the flight data while also evaluating jumpers, spotters and pilots. The tracking system was also tested by the United States military and other jumpers. In particular, data were collected from twelve jumpers during their rookie training and from veteran jumpers. This consisted of seventy-five individual jumps over two weeks, and the tracked data provide quantitative evidence of diver skill improvement using the intelligent tracking system. With the tracking and feedback system, rookie jumpers overall doubled their landing accuracy between the first and second week of jumps.

The inventor developed the "Skydiver Tracker", which is skydiving training/safety technology. It's been purchased and successfully field-tested in hundreds of jumps by the U.S. government and as noted by a skydiver training manager, it allows them "to help teach parachute manipulation to new jumpers and refine techniques for experienced jumpers . . . . Your concept of a GPS-guided cargo delivery system is of interest to us" since "being able to stay at a higher altitude to deliver cargo packages would lower our mission risk."

The Ideal Team Virtual Reality (VR) Simulator: Low cost/Portable for Realistic Training before Jumps and Debriefings/Accident Investigations after Jumps. It revolutionizes training and safety with; (1) Virtual Reality Team (VR) Simulators which permits practicing at any real locations worldwide before jumps and (2) two-ounce $100 trackers create flight data which can be used to customize the simulator for the exact parachutes and payloads used by special forces and for 3D graphics for post-jump debriefings/accident investigations far beyond existing capabilities. The Skydiving Tracker should be used on every jump during rookie training or before missions.
Stunning YouTube Skydive Simulation into Grand Canyon—http://youtu.be/n2srxXJ1Qs8

Figure 2:
FIG. 2 shows a Smokejumper (in gear) 201 training on our non-Virtual Reality (VR) version and the advanced version with a VR Headset 204 where no display 202 is needed.

These interrelated technologies transform skydiving training/safety with: (1) a Virtual Reality (VR) simulator which permits practicing simulated jumps anywhere in the world prior to a real skydive and (2) two ounce $100 trackers which create actual flight data/3D graphics for post-jump debriefings/accident investigations far beyond existing capabilities as shown in the jump into the Grand Canyon. It should be used on every jump—especially during rookie teamwork training. This black box (low-cost trackers with additional options) provides flight data and interactive 3D maps and videos which can be: (1) used for debriefings for the spotter, pilot, and jumpers after skydives; and (2) it provides crucial flight data for accident investigations. The headset and sensors permit the user to move their arms as in the real skydives and practice jumps anywhere in the world. FIG. 2 shows a smokejumper (in gear) 201 training on our non-Virtual Reality (VR) version, but a more powerful option shows a VR Headset 204 where no display 202 is needed. The sensor 203 tracks the users' arm movements like a real skydive. The jumper pulls imaginary (or real) toggles which control the chute. If their arms are straight up they fly at the maximum speed straight ahead but if one arm, i.e. the left, is down they turn left.

Not a Game, Real Flight Data Provides a Real Simulator—Using data from only a few jumps low-cost trackers' flight data can simulate the types of parachutes and payloads you use. A simulator which can't be customized based on real flight data performance is only a game.

Figure 4:
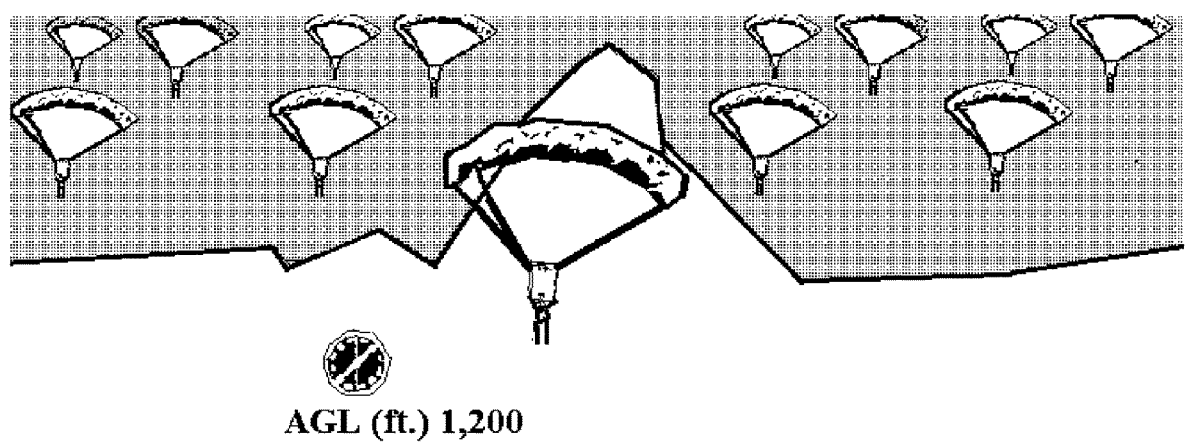
FIG. 4 illustrates how to plan real missions worldwide in minutes.

Team Training—The training is also for a team of 12 or more jumpers. FIG. 3 shows how low-cost Jump VR Simulators (301, 309) can be setup in minutes to train a team. The skydiving instructor sees all of the jumpers in a top-down daytime view with their flight data and all topography on a 3D color map on the screen 316. Due to space limitations, FIG. 3 only shows 12 skydivers on the map (Jumpers J1-J12) and the headsets of 9 members of the team who are practicing together. The team could train in the same room or worldwide on a networked. During this mission they are circling an island. For night jumps, each jumper's headset only shows a real pitch-black sky with small indicator lights to avoid each other. FIG. 4 shows 13 other jumpers in this VR view where they must avoid colliding with others during the mission. For example, Jumper 1 with a headset 301 is J1 on the map and at 1,200 ft. AGL, while jumper 9 with the headset 309 is J9 on the map and at 1,300 ft. AGL. The team's mission is to land at the target on the north side of this remote island. Some jumpers may become disoriented with such real simulations and they should be monitored and may not be suitable for extreme skydives.

The training equipment kit is portable using a headset, PC, sensor and optional screen. It weighs less than 8 lbs. and it's easy to transport and the training kit can be connected and installed to start training in a very short time, i.e. 10 minutes. You can practice missions anywhere in the world in daytime, twilight or nighttime.

Indicators in headset Customizable: A compass, target point and distance to target, altitude and speed can be seen in the screen of the headset of each jumper. As you move your arms like real skydives to pull the toggles which control the chute, the sensors track your arm movements FIG. 2 203, i.e. when the arms holding the toggles which control the chute are straight up you fly at the maximum speed straight ahead. During the jump you pull the imaginary toggles to control the VR-canopy and head towards the targeted landing site.

Debriefings after Jumps: The flight data from each jump is saved as a spreadsheet which can be named such as Jumper 1 on Jul. 1, 2017 in the U.S. Thousands of jumps can be saved and sorted and be used for debriefing, accident investigation and/or to customize the simulator.

Ideal for Extreme Missions—Night jumps can be in pitch black. FIG. 4 is what each jumper using the headset in FIGS. 2 and 3 sees in stunning 3D color and in high-resolution at 60 frames per second, which no black and white image can convey (Instead see the YouTube color video of a jump into the Grand Canyon). The simulator uses sensors so jumpers simply move their arms up and down to turn just as in real jumps FIGS. 2 and 3. The goal is to avoid hitting that jumper in the air but landing close together on the ground as a team mission. Our VR headsets immerse you into a 3D world which you explore by simply turning your head and it creates an amazing experience where you simply move your arms to control flight as you're immersed with the headset in a 3D world. It even includes malfunctions.

Unique Interactive Tours Using Stunning Interactive Videos—Now Travel Sites and Science Museums can offer amazing educational Virtual Reality Tours of the greatest geological and manmade sites around the World and the Solar System. This technology is awe-inspiring, yet affordable and can be customized for a room of stunning 120 to 360-degree video on 65-inch displays. Sit back and enjoy the ride, however they're fully interactive—during your remarkable fly-throughs from the charming town of Zermatt to the peak of the Matterhorn, the Apollo Moon landings and Mars. Stop to view any perspective and search for museums, etc. and then it automatically resumes the tour. It includes hundreds of locations and additional customized tours can be added.

Figure 5:
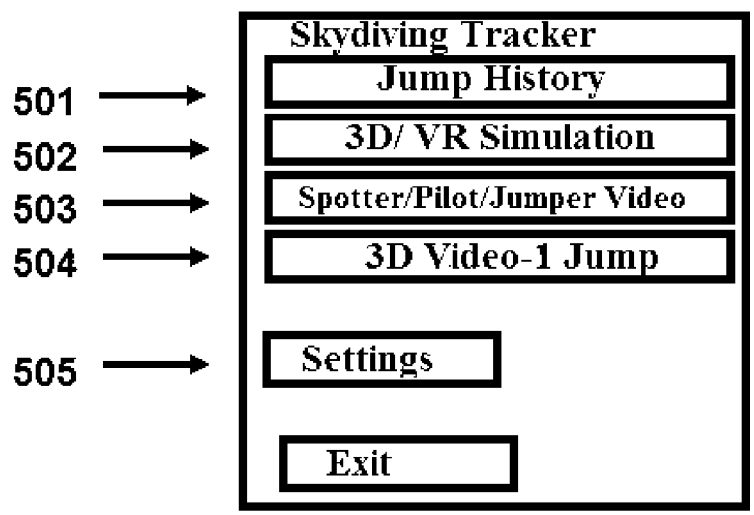
FIG. 5 shows a sample of an elegantly simple user interface to operate this powerful system.

The technology is easy to use as shown by FIG. 5 which is a sample of an elegantly simple main menu user interface where with just 3 clicks you can review thousands of jumps for skydiving training and safety. The key features are: Option 1 (block 501), the Jump History, imports thousands of Jumps and creates stunning interactive videos. Option 2 (block 502) is the 3D/VR Simulation which allows the user to move their arms up and down like a real jump where their movements are tracked by a sensor and translated into the real flight data. You can don a VR headset and see a stunning interactive skydive or see a stunning display on a 65-inch display as shown below in FIG. 2. Options 3 (block 503) and 4 (block 504) provide other choices to view flight data; and Option 5 (block 505) permits the user to set all settings for simulations (including malfunctions) and type of trackers for collecting flight data. This illustrates a sample menu which shows how easy it is harness the power features of this system.

The Powerful Capabilities of the Skydiving Database—Over 400 skydives were tracked with the Skydiving Tracker and are part of a growing Jump History. Now with only 3 clicks all flight data for the aircraft and jumpers is available with interactive 3D maps and video for these jumps including accidents. The BLM accident report on the tragic 2013 death of Mark Urban was issued almost 8 months after his death and this report included limited aircraft flight data, and no interactive maps of the flight of the aircraft or jumper. Also, thousands of dollars were invested in a flight data recorder which provided limited data as noted in the report of this flawed data logger which "did not render the data useless, but [increased] the degree of uncertainty associated with each data point . . . . No information was provided [regarding] the aircraft flight speed". Our $100 tracker provides flight data with stunning graphics. Obviously, our tracker technology should be used for daily training missions, not expensive alternatives. Our technology could have provided immediate, reliable backup flight data including 3D maps/videos of what happened. Our system tracked an accident (not shown for privacy reasons) and showed why a jumper landed over 150 yds. from the targeted landing spot and suffered significant injuries.

Figure 6:
FIG. 6 shows how a skydiver safely lands in a dense forest by correctly turning at 380 AGL (Above Ground Level) ft. to reach a clearing in the forest
Figure 7:
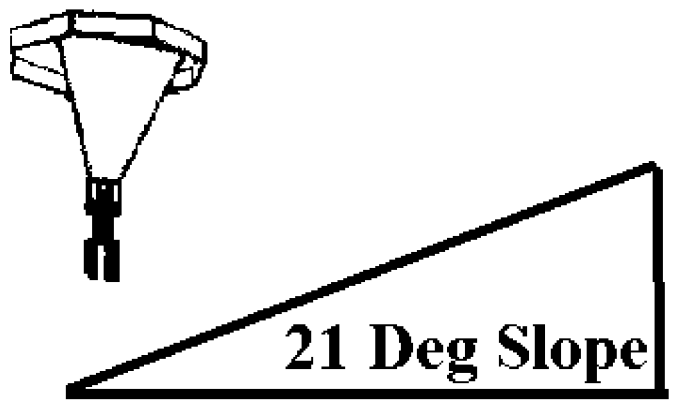
FIG. 7 shows another jump where the skydiver was injured landing on a 21-degree slope.

Flight Data and 3D Graphics of Actual Injuries and Safe Jumps—FIGS. 6-9 show either one jumper or a team of 10 jumpers landing in an area of forests and shrubs (in black or grayscale per the Patent format requirements). However, the actual technology shows everything in stunning realistic color such as the YouTube Skydive into the Grand Canyon. FIG. 6 shows how a tracker jump successfully turned at 380 AGL ft. to reach a clear landing in a forest, while FIG. 7 shows another tracker jumper who was injured landing on a steep 21 Deg. Slope since he made the wrong turn at the crucial 350-500 ft. AGL.

Figure 8:
FIG. 8 shows 3D (lines to ground) during the final approach to precisely land in a small clearing in the forest. This is another view of FIG. 6. However, these effects are much more dramatic in color so view the YouTube videos for some stunning views rather than 2D simple illustrations.

The Skydiving Tracker provided extensive flight data/3D graphics on a 2016 injury in much more detail than existing accident reports which can cost tens of thousands of dollars and take months while our report took an hour. However, for privacy concerns that injury isn't shown. Instead FIGS. 6-8 show an amazing jump where the jumper avoided the trees in a clearing of only 100 ft. The tracker shows the jumper exited the aircraft at 9:07:14 with winds of 4 mph. To avoid trees in the narrow landing area he turned at 380 above ground level (AGL) and landed at 9:08:43. This jump and the accident both show that in the final 400 ft. AGL, the braking/turns determine the difference between a safe jump or an accident. While this landing was in flat terrain, the tracker can show steep slopes, i.e. 21 degrees. Minutes after the data was received the Skydiving Tracker quickly created all the graphics in FIGS. 6-8 showing an amazing safe jump. Also, novices can use the simulator to practice broken steering lines and chute malfunctions before jumps to learn how to avoid injuries.

FIG. 8 shows 3D (lines to ground) during the final approach for clear landing. This is another view of FIG. 6. The aircraft's flight path on another jump (not shown due to the limitations of black and white drawings) shows the plane circled at 1,500 ft. AGL to release the streamers to determine wind speed, then the aircraft (yellow) increased to 2,000 ft. AGL where the jumpers exited. The normal exit for round chutes is 1,500 AGL but the higher altitude was to allow more time so the jumper could practice steering control line problems. FIGS. 6-8 illustrate our system's powerful analytical capabilities using low-cost trackers; however, it can be customized to work with any trackers.

Figure 9:
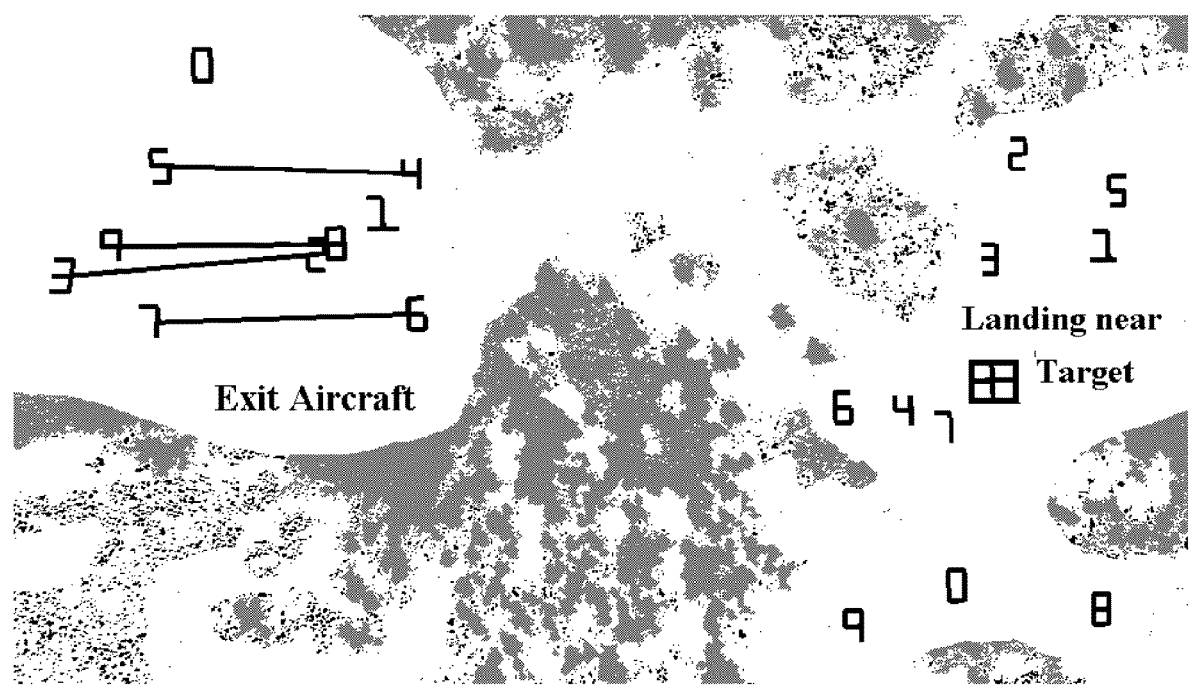
FIG. 9 shows how trackers automatically transform data into 3D interactive maps identifying the wind speed, the type of movement (aircraft, round parachute), and rates spotters and Jumpers.

FIGS. 6-8 show the progress of one jumper but a much more powerful option is the ability to rate a planeload of 10 or more jumpers as shown in FIG. 9. This shows a flat area with trees and shrubs shown in black and grayscale (the actual version is in stunning color but the patent application limitations specify black and white drawings). Our technology searches through millions of datapoints from trackers, corrects them for errors, then identifies the wind speed by estimating the targeted drop point from target, and identifies the type of movement, i.e. round parachute, aircraft, etc., using the flow chart logic in FIGS. 14-18 and the database of prior jumps and aircraft shown in overview of FIG. 1.

The left part of FIG. 9 shows 10 rookie smokejumpers who exited the plane from 782 ft. to 1,209 ft. from the target (the cross in the box). They exited at 1,478-1,580 ft. Above Ground Level (AGL). Our proprietary logic automatically calculated the wind speed at 8 mph, the type of aircraft and the type of parachute they were using (a round parachute). They usually exit two at a time such as jumpers 6 and 7 where jumper 7 landed the closest to the target—89 ft. which was the best of the group. The line connecting jumpers 6 and 7 shows the plane's flight path. The aircraft circled 6 times to release all 10 jumpers. The exit points rank the combined skills of the pilots and spotters who decide the optimal point so the jumpers can land closest to the target based on the wind speed and direction. The grey and black areas are trees and bushes.

This technology automatically transforms millions of datapoints from the trackers into 3D interactive maps identifying the wind speed and the type of movement (aircraft, round parachute) and rates spotters, pilots and jumpers. Based on the exit point on the left of FIG. 9 the spotter and pilot did an excellent job of circling the plane 5 times and placing the jumpers in the ideal location to land safely. Unfortunately, these were rookies with limited skydiving skills and they landed from 89 ft. up to 377 ft. from target which is very poor since they could land in trees or other hazards. Skilled jumpers usually land within 50 ft. of target but after a few weeks of training the majority of these rookie jumpers land within 70 ft. of target. The amazing capability of the skydiving tracker is the jumper simply puts a 2-ounce tracker in the pocket and immediately after the jump (or during the jumps with the real-time version) it plots a variety of interactive 3D maps which shows their progress—an invaluable tool for skydivers.

FIG. 9 was from a planeload of rookies and they used the tracker technology to both debrief and track rookie jumpers over a two-week training; and the outcome of landing accuracy, i.e. distance to spot, was measured and compared with various wind speeds in May/June of 2016.

Figures 10, 11:
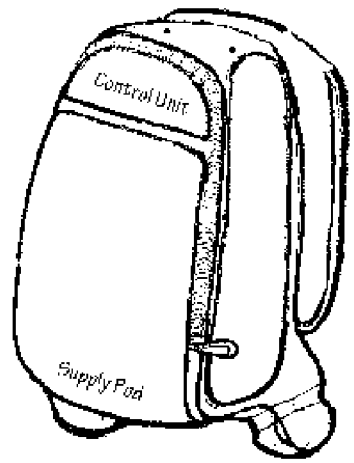
FIG. 10 (Table 1) shows how the system was used to train a team of 10 rookie skydivers.
FIG. 11 shows a torso-like supply robot with parachute when it's packed before deployment.

FIG. 10 (Table 1) shows that while the rookie jumpers landed an average of over 200 feet from their target in their 1st week, by their second week they were landing within roughly 100 feet from spot—a dramatic improvement. The training, debriefing and precise information provided as feedback can attribute to this increased performance. Note that the landing distance to spot is one of the key measures of their success and safety, since the closer a jumper lands to the spot (target), the less likely they are to land in dangerous areas or to crash into trees. Unsurprisingly, the well-trained veteran jumpers performed well, landing at within 70 feet of spot in 11 mph winds and landed within 52 feet with lower winds.

Additional related features of this technology—Radios with antenna and real time data—we also use inexpensive $200¼ lb. digital radios with antenna to provide real-time flight data to send info to the pilot on the best flight path and to notify the jumpers when to exit the plane and the latest wind conditions. They use simple streamers to test the wind conditions but with our integrated solution—we send the latest wind conditions to notify the pilots and jumpers. Wind conditions are crucial since the exit point from the aircraft must be based on the wind and the ideal landing is into the wind. In short, we provide real-time data for tracking both in the air and on the ground. This was a crucial issue when 20 elite "hot shots" ground crews died in Arizona. Their death report is attached. We proposed our solution before they died. In addition, with the real-time guidance system we created resupply robots (shown below):

Emergency Medical System—FIG. 11 shows our proven technology which can land within 30 ft. of target. It shows a backpack used in the 1$^{st}$ robotic flight test (future flights used a streamlined design). This torso-like supply robot with parachute (preflight) uses low-cost, lightweight stepper motors to pull toggles, the skydiver's flight controls, which operate the parachute's flight. When the parachute opens the motors pull nylon cords attached to the toggles to autonomously guide the parachute to the targeted landing site as shown in the P successful robotic test flight.
YouTube Robotic Flight Test—https://www.youtube.com/watch?v=jEDibD18O4E&feature=youtube_gdata The US military have expensive systems which work in large clear areas (unlike cluttered forests in wildfires). However, during the Syrian war a robotic resupply unit didn't precisely land and the U.S. DoD delivered $1 million of weapons to terrorists because it landed ½ mile away from the target. This failure shows the need for our VR-like manual control overrides for precise landings of small payloads—an option which more expensive units lack.

Figure 12:
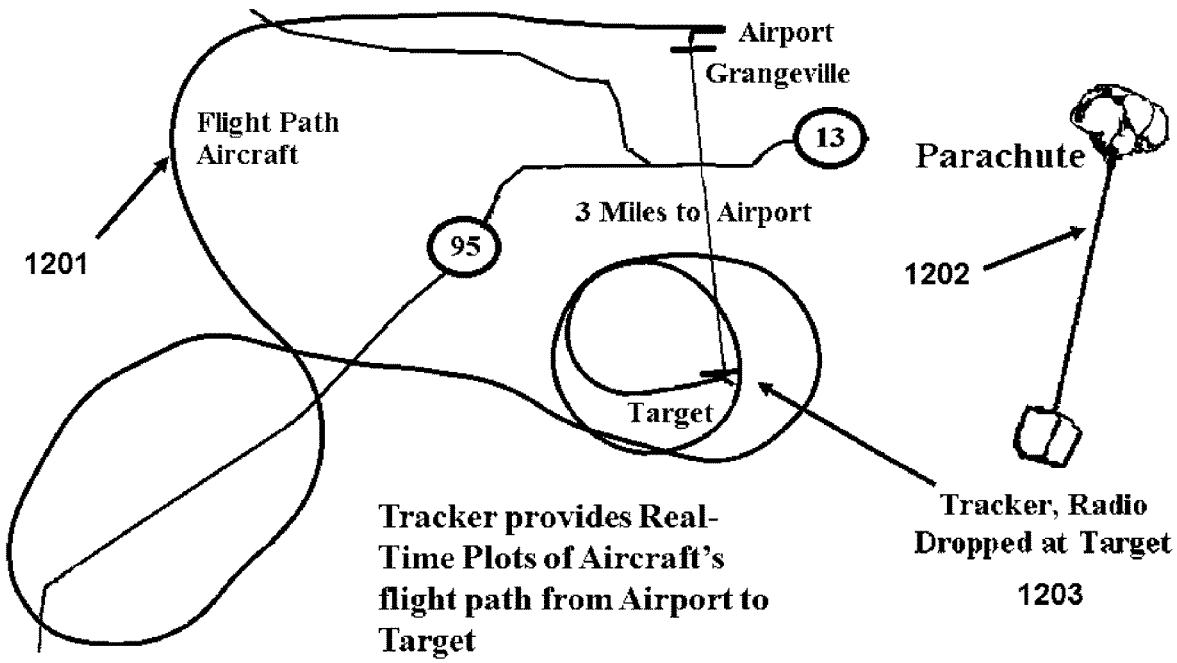
FIG. 12 show a real-time tracker with a 10-mile range. The tracker with a parachute and radio and antenna 1203 is dropped from the aircraft at the target to track wind speed and direction to help the jumper make a safe landing and to direct the pilot and spotter to the best location to exit the plane. This real-time tracker plots the flight path of the aircraft from takeoff until it's dropped at the target.
Figure 13:
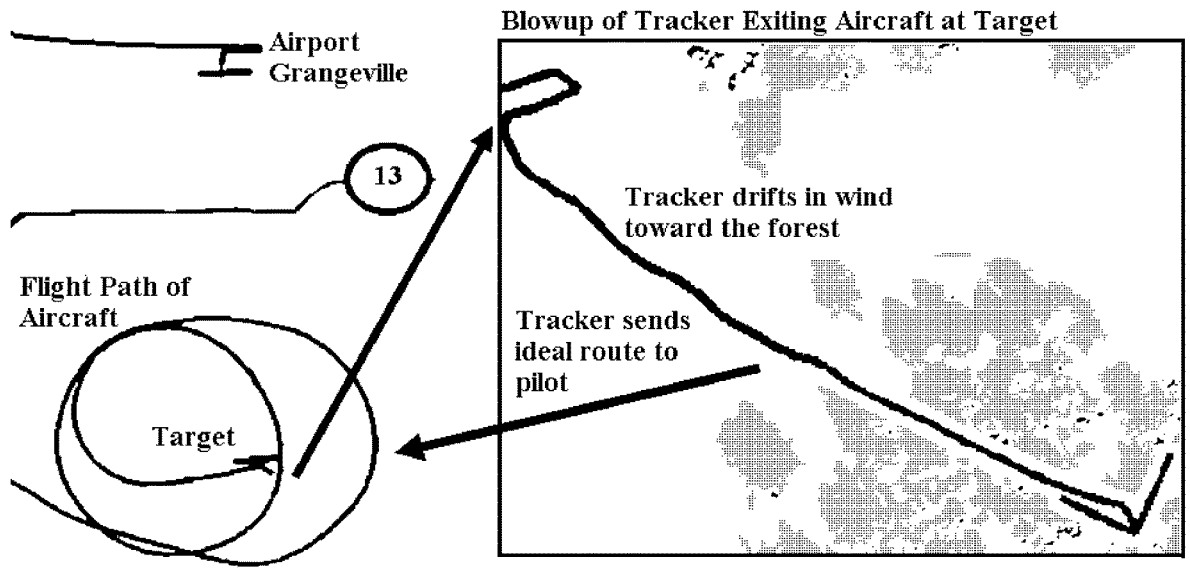
FIG. 13 is a blowup of FIG. 12 where the tracker on the parachute drifts in the wind and relays the pilot's ideal flight path to drop the jumpers based on the wind speed and direction.

Emergency warning network—We've customized a 900 MHz network with enhanced antenna, which already operates over 10 miles and can be expanded to over 100 miles. Even if the firefighter's radio or cell phone failed, this network might still be able to automatically, continuously, send their real-time GPS data in small data packets. Ideally, this would be monitored by aircraft overhead during emergencies. The Yarnell Accident Report noted that "At the time of the shelter deployment, a VLAT (Very Large Air Tanker) was on station over the fire waiting to drop retardant as soon as the crew's location was determined." This technology might have helped: (1) it automatically broadcasts their location to direct the VLAT where to drop retardant or (2) if the VLAT failed, skydiving robots could precisely deliver water to douse trapped firefighters (a high-speed water spray could be added). Also, see "60 Minutes" report on how 5 U.S. soldiers died in a friendly-fire incident in Afghanistan on Jun. 9, 2014 due to failures of the most advanced communications systems in the world. where two 500-pound bombs were dropped by a U.S. bomber due to network limitations couldn't clearly identify friend from foe, clearly a void addressed by our system which creates a local mapping network using low-bandwidth high-range 10-100-mile digital radio which can be integrated into broader cell or other networks. https://www.cbsnews.com/news/why-were-five-u-s-soldiers-killed-by-an-american-bomber-in-afghanistan Real-time Tracker in Air/on the Ground using long-range radios—Radio tests confirmed that continuous communications could be maintained for up to 10 miles (over 100 miles with more powerful radios and antenna). FIG. 12 with a zoom-in in FIG. 13 showed amazing results: a 900 MHz device in a plane traveling at 130 mph maintained communications with a receiver on the ground for over 10 miles. The real-time tracker (FIG. 12, 1202) has a radio, GPS, parachute and costs only $350 and weighs 2 lbs. It broadcast its location inside the plane until it exited the plane and then it precisely relayed the wind speed/and direction of the plane's flight 1201. This test confirmed that a plane circling at 10,000 ft. could constantly monitor smokejumpers and firefighters exact GPS locations on the ground in a radius of over 10 miles.

FIG. 12 shows it can provide real-time flight instructions to the pilot to fly the optimal route where to drop the jumpers so they land in the best location relative to the target where the goal is to exit upwind and land at the target turning into the wind to reduce speed and minimize the chances for injury. These tests also confirmed that $100 trackers could be attached to existing streamers (with no parachute) to confirm how accurately spotters estimated the wind and the trackers/radios were rugged enough to survive multiple drops. These radios would automatically transmit the fire fighter's location if they lost their primary radio communications. Even when the firefighter's voice radios are working, these digital radios update their location on 3D maps at a command center. It could operate at 900 MHz which is slower yet offers longer range than 2.4 GHz networks. A cell phone app can be used; however, cell networks usually don't work over 5,000 feet above the ground and don't work in remote forests.

As show in FIG. 13 this is the final part of this integrated solution to improve skydiver training and safety especially for teams of 12 or more jumpers on crucial missions such as smokejumpers or military personnel, but also for civilian jumpers who may want to jump as a team. It helps the pilot, spotters and jumpers work as an integrated team using this state-of-the-art technology. All these safety and training features apply to individual jumpers, but the benefits and uniqueness of this technology are even more powerful as the team of jumpers increases, as noted in FIG. 1

Figure 14:
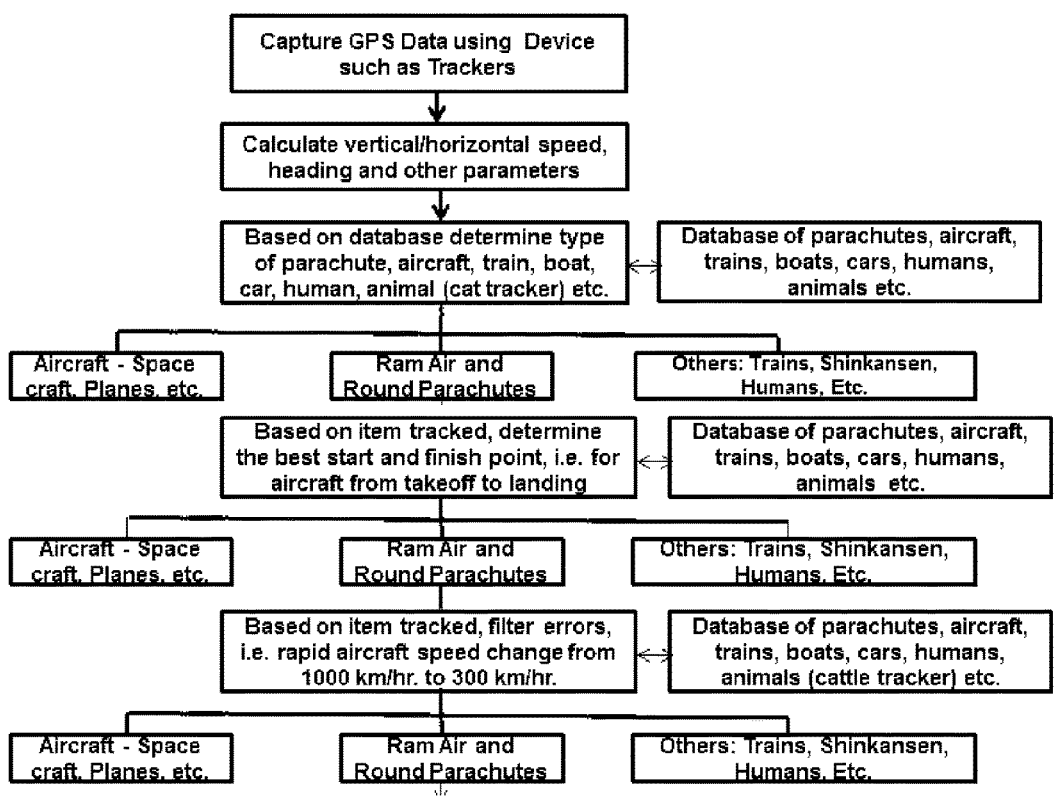
FIG. 14 is a Flow Chart showing how flight data is cross-checked to automatically identify the type activity (plane, skydive) for 3D interactive plotting and best angles for debriefings.
Figure 15:
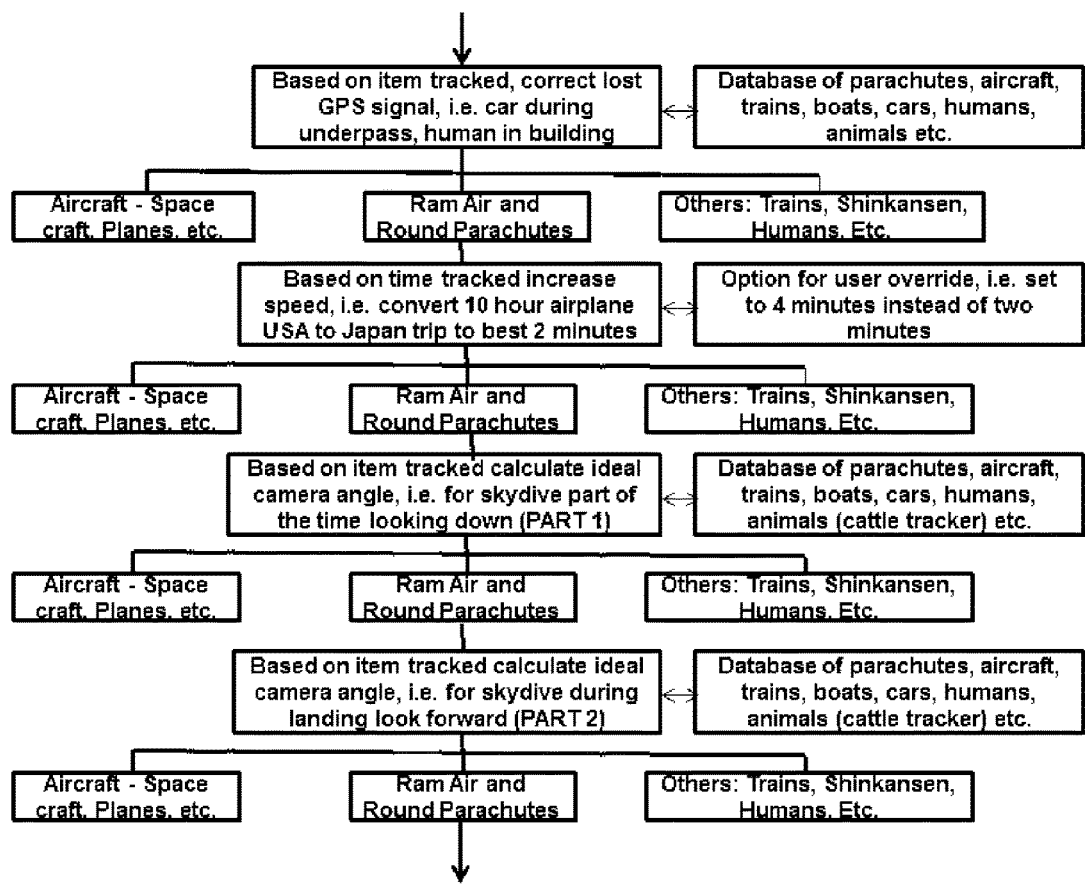
FIG. 15 is a Flow Chart which reveals the logic to dynamically plot customized 3D Plotting/Debriefings for any type of movement in 3D interactive Graphics.

FIGS. 14-18 show how the tracker data is used to identify the type of movement, i.e. aircraft, skydive etc., correcting errors in the data and calculating the best angles and perspectives to view the plots in 3D interactive maps or videos. FIG. 14 summarizes how the captured data is cross-checked with a database of many types of movements, from humans to trains, Round and Ram Parachutes, helicopters, Propeller Aircraft, Jet Aircraft and Spacecraft. Then the 3D interactive flights and/or tours, i.e. a Ram Parachute, using the best angles for debriefings and/or tours are automatically created. FIG. 15 reveals the logic to dynamically plot customized debriefings for any type of movement in 3D interactive graphics.

Figure 16:
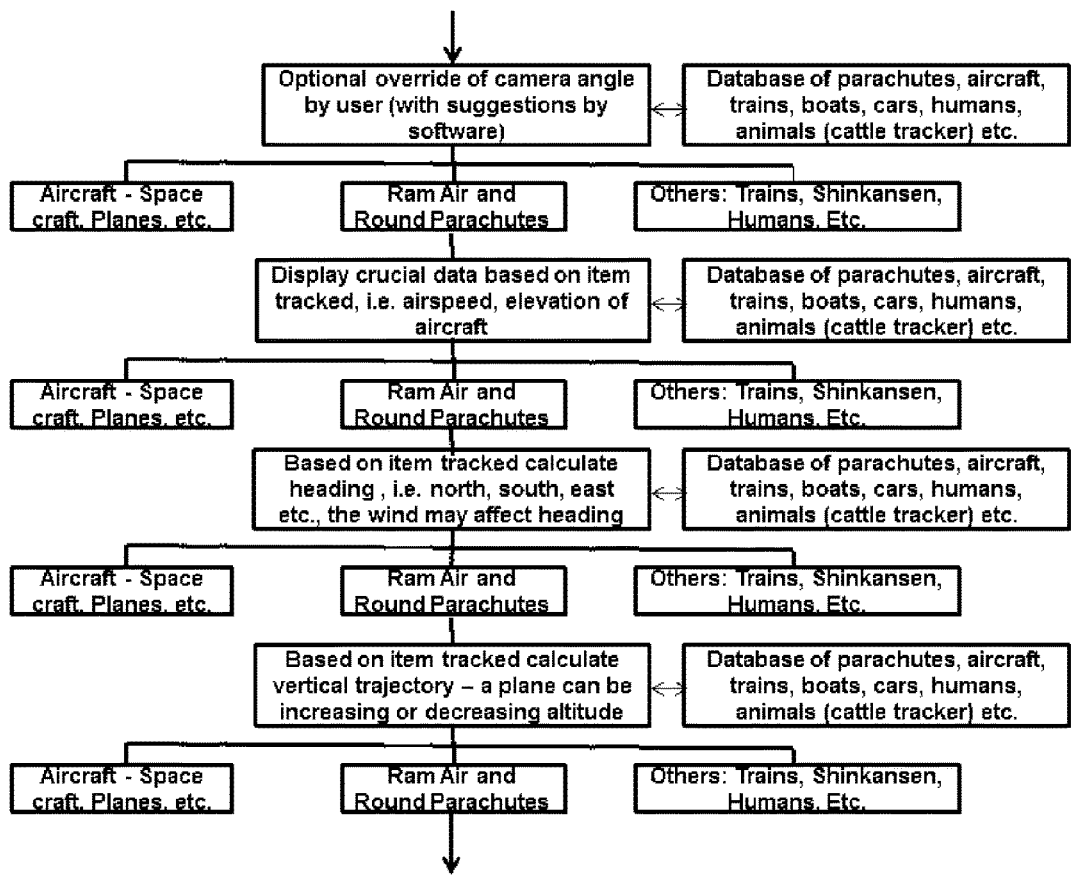
FIG. 16 is a flow chart logic for creating customized 3D plotting/debriefings.
Figure 17:
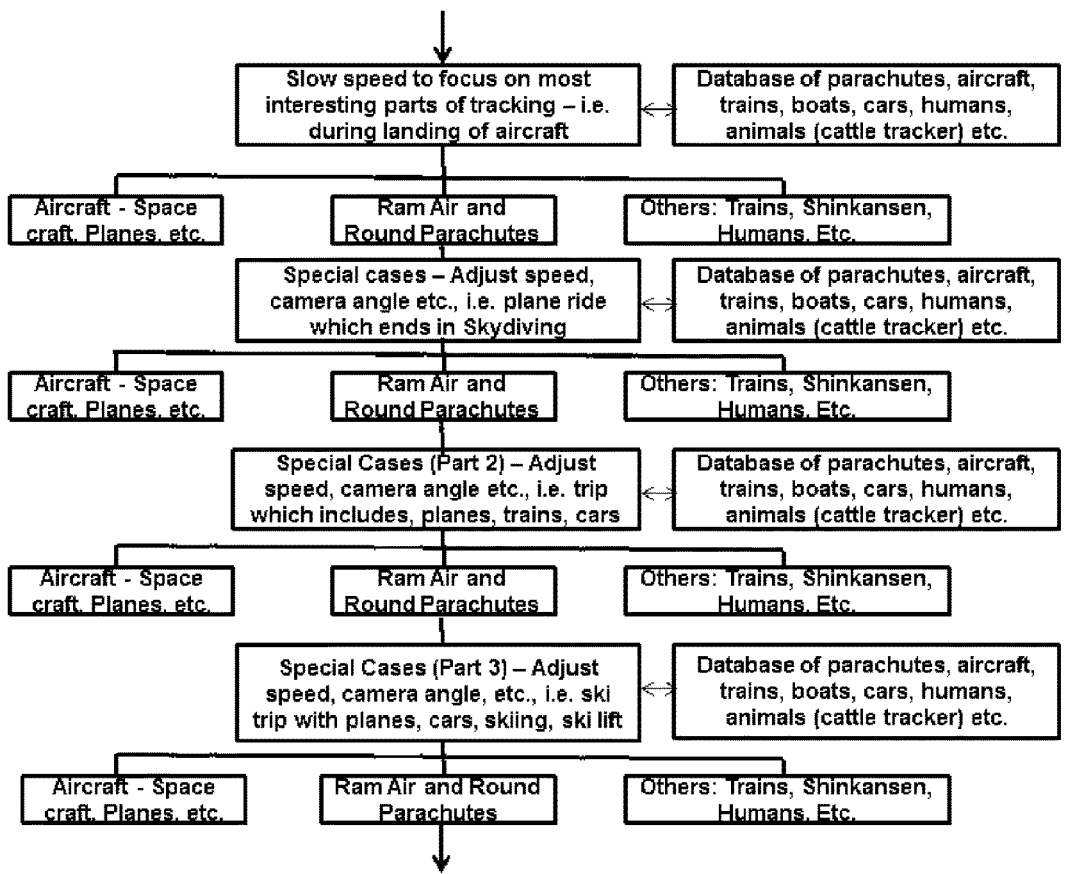
FIG. 17 is a flow chart logic for creating customized 3D plotting/debriefings.
Figure 18:
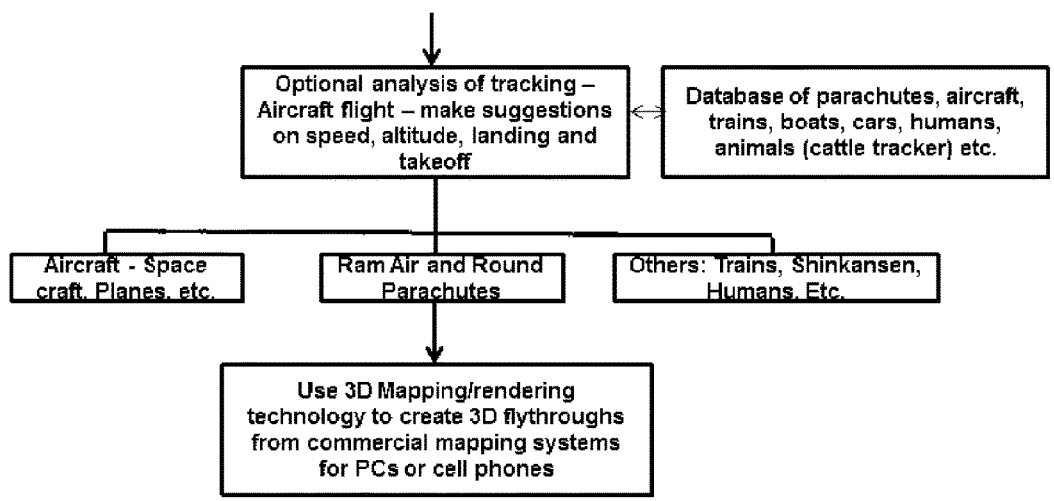
FIG. 18 is a flow chart logic for creating customized 3D plotting/debriefings.

For parts 1-5 of the Skydiving Tracker technology (FIGS. 14-18), the flow charts show how data from trackers automatically corrects data, and categorizes the type of movement, such as a walk, a skydive or a plane. FIG. 16 reveals additional Logic for creating customized 3D plotting/debriefings. Based on the item tracked, it corrects any lost GPS signal, i.e. a car driving under a bridge, or a human in a building. Also, based on time tracked it can automatically increase speed, i.e. convert a 10-hour airplane USA to Japan trip to, at most, 2 minutes. It shows the ideal camera angle, i.e. for skydive part of the time looking down, but during landing, looking forward. It slows the speed to focus on the most interesting parts of tracking—i.e. during landing of aircraft. In special cases it adjusts the speed, camera angle, etc., i.e. a plane ride which ends in a skydive, or a ski trip with planes, cars, skiing, ski lift. Finally, FIG. 17 uses 3D Mapping/rendering technology to create stunning 3D fly-throughs using low-cost commercially available digital maps available for PCs or cell phones.

The Skydiving Tracker revolutionizes skydiving training and safety for both individuals and teams of skydivers with: (1) Virtual Reality Team (VR) Simulators which permit practicing at any real locations worldwide before jumps and (2) two-ounce low-cost trackers create flight data which can be used to customize the simulator for the exact parachutes and payloads used by teams of skydivers and for 3D graphics for post-jump debriefings/accident investigations far beyond existing capabilities. The Skydiving Tracker should be used on every jump during rookie training or before missions.

The following is from an unpublished paper which may be presented by the inventor and his colleagues. Additional information on the error-checking techniques used in this technology:

Error checking—simple extrapolation. When data is missing, the missing data between good data points is extrapolated based on the prior speed, direction etc.

Error checking—cross checking—When there is a plane-load of 12 or more jumpers, the data between jumpers is cross-checked. For example, this elegantly plots the path of the plane prior to exit in order to rate the pilot and spotter on how well they do their job. However, of the 12 jumpers maybe only a couple have clean data in the plane so only the best jumper data in the plane is used. Once they exit the elevation of the jumpers is cross-checked since they are exiting at roughly the same altitude and landing at roughly the same altitude. And if any jumper has too many error points, that jumper is removed from the final plot of the flight paths of the 12 jumpers. It's extremely elegant and automatic. On each jump a 3D interactive plot is created which shows the path of the plane and the exit point and landing point and the flight path of all the jumpers—with clean error-corrected data.

Error Checking—Continuous and precise positioning in skydiving is requisite for near-real-time and useful feedback, both during and post jump. Two types of sensors are used to provide the position of a mobile skydiving subject: absolute sensors and dead-reckoning sensors. GPS sensors are an example of absolute sensors. Although it can reach precision on the order of centimeters, it lacks credibility in some cases due to multipath or mask effects. This often results in unwanted mixture with other sensors and data streams. In contrast, dead-reckoning sensors, for example gyroscopes and accelerometers (also known as inertial sensors), have the advantage of giving continuous positioning information. The information given in this case has the advantage of being independent from the external environment.

Inertial sensors may be classified into two groups: inertial measurement units (IMU) and the inertial navigation system (INS). The IMU delivers raw data that is corrected from scale factors and biases using gyroscopes and accelerometers. The INS is an IMU whose output is sent to navigation algorithms to provide position, velocity and attitude of an object.

Several methods have been used to consolidate good data and reject outliers from multiple sensors. The Kalman filter has been employed to study GPS/INS data fusion. Experimental results have shown that extended degradation or loss of GPS signal can lead to positioning errors quickly drifting with time. This indicates that GPS/INS association is less than satisfactory. To resolve this, additional sensors have been suggested. Augmenting with additional sensors can result in more precise positioning information. The Kalman filter is especially suitable for the integration of multiple sensors. This can be done without reconstructing the filter.

Another way to reject errors is through the RANSAC-based outlier rejection method. This method allows for the random selection of subsets of feature correspondences. In visual odometry and other computer vision tasks, RANSAC estimates egomotion based on random subsets. The number of used subsets is given by $$n=\log(1-p)/\log(1-(1-\varepsilon)^s) \quad (1)$$

Here, s represents the minimum number of data points needed in the estimation, p represents the probability that at least one sample contains inliers only and defines the assumed percentage of outliers in the data set.

Upon convergence of the Kalman filter, inliers can be classified via a threshold of Euclidean reprojection error. The final estimate is given using a final estimation step with all inliers of the best sample. The proposed method added on to the RANSAC-based outlier rejection scheme generates a robust estimation and outlier rejection method.

A. Overall Workflow

The Kalman filter is amenable for multisensory consolidation. Validity domains of each sensor in the filter are defined in order to reject data errors when detected. This ensures the reliability of the data fusion. In layman's terms, the Kalman filter is an estimator that employs a prediction step and an update step.

To use Kalman Filters for non-linear problems, linearization around the current state is often performed using a first order Taylor-approximation. This generates the Extended Kalman Filter. The update step is often performed to reduce the approximation error caused by Taylor approximation and consider assumed Gaussian noise.

B. Data Processing

Two Kalman filter models can be considered. First recall the standard Kalman filter state model. The state model chosen is a Wiener process acceleration model. It is a basic model that gives a good compromise between complexity and performance. In such a model, state transition matrix F and noise w are given by:

$$F = \begin{bmatrix} I_3 & TI_3 & \frac{T^2}{2}I_3 \\ 0_3 & I_3 & TI_3 \\ 0_3 & 0_3 & I_3 \end{bmatrix} \text{ and } w(k) = \begin{bmatrix} \frac{T^3}{6}B \\ \frac{T^2}{2}B \\ TB \end{bmatrix} \gamma(k) \quad (2)$$

With $\gamma(k) \in R$ a zero mean white Gaussian noise of assumed known variance.

$$B = \begin{bmatrix} 1 \\ 1 \\ 1 \end{bmatrix}, I_3 = \begin{bmatrix} 1 & 0 & 0 \\ 0 & 1 & 0 \\ 0 & 0 & 1 \end{bmatrix}, 0_3 = \begin{bmatrix} 0 & 0 & 0 \\ 0 & 0 & 0 \\ 0 & 0 & 0 \end{bmatrix}$$

In addition to the standard state model are measurement models. Absolute sensor data is considered, as well as observations from IMUs. These data are obtained by transforming data given by accelerometers from the body frame to the reference frame using gyroscopes.

What is claimed is:

1. A system for skydiving training comprising:
   a computer including:
   a flight database of skydives;
   a simulator including a virtual reality headset or an optional display for simulating skydiving jumps,
   a sensor which tracks up and down arm movements, wherein the arm movements simulate controlling turns and speed of a parachute;
   a tracker comprising flight data from previously recorded real skydive jumps, the flight data including latitude, longitude, altitude, and wind speed, wherein the flight data is automatically error-corrected;
   wherein the flight database of skydives is continuously updated with the error-corrected flight data from the tracker and the simulator simulates skydiving jumps based on the flight database of skydives and the arm movements tracked by the sensor;
   wherein the simulator is further configured to create 3D interactive maps for debriefings and accident investigations.

2. The system of claim 1 further comprising:
   a digital radio or a network for real-time communications with ground personnel or with aircraft flying,
   wherein the real-time communication provides continuously updated data for real-time 3D maps of jumpers both in the air or on the ground, the system further provides real-time tracking of a team,
   wherein the real-time communications integrates into broader cell or LAN (Local Area Networks) or WAN (Wide Area Networks), the internet, cell phone or other networks.

3. The system of claim 1 wherein the flight database includes parachute flight parameters including the type of chute, weight of jumper, latitude, longitude, altitude, and feedback from expert skydivers.

4. The system of claim 1 wherein the 3D interactive maps permits reconnaissance to scout for safe clear landing zones which can be networked in a room of 120 to 360-degree interactive videos on large screen displays if a headset is not used.

5. The system of claim 1 wherein parachutes are simulated including Round chutes, Ram chutes, chutes used by military including special forces, chutes used by government and civilian jumpers, and the system further permits teams of jumpers to practice simulations locally in a LAN or worldwide via networks WAN, cell phones or the Internet.

6. The system of claim 1 further comprising shared simulated flight data over a network locally or remotely with views of night or day jumps including views of other jumpers so teams of jumpers can practice together.

7. The system of claim 1 further comprising:
   an earphone which is configured to provide verbal directions during jumps,
   wherein the directions are provided via a computer on the jumper or networked from a ground location or from a plane or via instructions from a trainer on the ground or in a plane.

8. The system of claim 1 further comprising:
   a streamer to pinpoint an exit point for the jumpers based on wind speeds and landing terrain,
   wherein the computer is configured to calculate the wind speed and direction prior to jumps based on the flight data using sensors on a streamer or a parachute, and
   a radio, or network, or cell phones continuously relay flight data to an aircraft to direct the pilot to an optimum flight path to fly the aircraft and where to drop skydivers based on a landing site and winds, to avoid landing on trees, power lines or other dangerous areas.

9. The system of claim 1 further comprising:
   a streamer to pinpoint an exit point for the jumpers based on wind speeds and landing terrain,
   wherein the computer is configured to calculate the wind speed and direction prior to jumps based on flight data, using sensors either on a streamer or a parachute,
   wherein the sensors provide flight data to the computer at a ground location when the sensors land,
   wherein the flight data form the sensors is sent via phone or radio to an aircraft to inform the pilot of an optimum flight path for the aircraft to drop skydivers based on a landing site and winds to avoid landing on trees, power lines or other dangerous areas.

* * * * *